(12) United States Patent
Reidlinger et al.

(10) Patent No.: US 7,115,686 B2
(45) Date of Patent: Oct. 3, 2006

(54) WATER-DILUTABLE POLYESTER RESINS

(75) Inventors: Gerhard Reidlinger, Graz (AT); Johann Billiani, Graz (AT); Rudolf Jedlicka, Wiener Neustadt (AT); Ewald Zrin, Graz (AT); Julius Burkl, Graz (AT); Johannes Scherz, Wundschuh (AT)

(73) Assignee: Surface Specialties Austria GmbH, (AT)

( * ) Notice: Subject to any disclaimer, the term of this patent is extended or adjusted under 35 U.S.C. 154(b) by 227 days.

(21) Appl. No.: 10/797,940

(22) Filed: Mar. 11, 2004

(65) Prior Publication Data

US 2004/0181030 A1 Sep. 16, 2004

(30) Foreign Application Priority Data

Mar. 12, 2003 (AT) ............................. A 392/2003

(51) Int. Cl.
*C08F 20/00* (2006.01)
*C08G 63/688* (2006.01)

(52) U.S. Cl. ................ 525/445; 528/287; 528/295; 528/295.5; 528/298; 528/300; 528/301; 528/302; 528/306; 528/307; 528/308; 528/308.6; 525/437; 525/443; 525/450; 525/535; 525/538; 525/540

(58) Field of Classification Search .............. 528/287, 528/295, 295.5, 298, 300, 301, 302, 306, 528/307, 308, 308.6; 525/437, 443, 445, 525/450, 535, 538, 540
See application file for complete search history.

(56) References Cited

U.S. PATENT DOCUMENTS

| 4,119,680 A | * | 10/1978 | Vachon ........................ 525/30 |
| 4,946,932 A | | 8/1990 | Jenkins |
| 5,907,003 A | | 5/1999 | Blot et al. |
| 6,333,378 B1 | | 12/2001 | Clark et al. |
| 6,576,717 B1 | * | 6/2003 | Kuo ........................... 525/445 |

FOREIGN PATENT DOCUMENTS

| DE | 24 31 410 | | 1/1976 |
| EP | 0 558 788 | | 9/1993 |
| EP | 0 649 439 | | 4/1995 |
| JP | 10-158346 | | 6/1998 |
| WO | WO 95/05413 | * | 2/1995 |
| WO | WO-95/05413 | | 2/1995 |
| WO | WO-99/07759 | | 2/1999 |

* cited by examiner

*Primary Examiner*—Samuel A. Acquah
(74) *Attorney, Agent, or Firm*—Connolly Bove Lodge & Hutz LLP

(57) ABSTRACT

A water-dilutable polyester resin ABCD having a mass fraction of from 1 to 10% of units derived from unsaturated cocondensed building blocks, an olefinic double bond content of from 10 to 2 000 mmol/kg, and a sulfonic acid group content of from 20 to 300 mmol/kg, modified if desired by copolymerizing olefinically unsaturated monomers in the presence of the polyester resin, a process for preparing them, and their use in particular in one-component coating compositions in combination with amino resin curatives.

10 Claims, No Drawings

WATER-DILUTABLE POLYESTER RESINS

FIELD OF THE INVENTION

The invention relates to water-dilutable polyester resins, to a process for preparing them, and to their use.

BACKGROUND OF THE INVENTION

Binders for coating materials can be provided in water-dilutable form by adequately stabilizing the disperse phase of binder droplets in a continuous phase of water. This can be achieved by adding an emulsifier (external emulsification, externally emulsified resins) or by chemically modifying the binder such that it contains ionic or other hydrophilic groups in sufficient quantity (internal emulsification, self-emulsifying resins).

One known way to water-dilutable binders based on polyester resins is the polycondensation of polyols, preferably diols, with polybasic, especially dibasic, acids, where a defined excess of acid groups remains in the polyester. After at least some of the acid groups have been neutralized, the resulting polyester resin can be emulsified in water to give stable dispersions. The polybasic acids can in particular be tribasic acids having acid groups differing in reactivity, such as citric acid or sulfoisophthalic acid, for example. Polyester resins containing moieties of sulfoisophthalic acid are known from, for example, EP-B 0 649 439.

Binders comprising polyester resins of this kind are crosslinked using crosslinking agents which react with hydroxyl groups of the binders. Suitable crosslinking agents are polyfunctional isocyanates, which in unblocked form are reactive even at room temperature, or in blocked form, which are reactive only at an elevated temperature above 80° C., preferably above 100° C., or etherified or unetherified amino resins. Polyesters of sufficiently high molar mass are also physically drying; that is, after the dispersant has evaporated, the binder droplets coalesce and form a film.

From EP-B 0 649 439 aqueous dispersions of linear polyesters and vinyl resins are known which include mass fractions of from 5 to 40% of the polyester and from 95 to 60% of a vinyl polymer including a mass fraction of at least 20% of repeating units derived from styrene or a styrene derivative. These dispersions are still amenable to improvement with respect to the following performance properties: more rapid (physical) drying, particularly in the case of highly pigmented coating materials (masonry paints, road marking paints) is desirable; crosslinking with amino resins (melamine resins) requires relatively high temperatures; in clearcoat materials pops are formed even at low film thicknesses, and wrinkles are formed in the dried coating film; the resistance to solvents and aqueous solutions is in need of improvement.

SUMMARY OF THE INVENTION

Surprisingly it has now been found that aqueous dispersions of polyester resins having a particularly high mass fraction of solids can be prepared if sulfoisophthalic acid or other units which can be condensed into a polyester, especially dicarboxylic acids additionally containing a sulfonic acid group, are incorporated into polyester resins which additionally include units containing polymerizable double bonds. It has also been found that polyester resins of this kind can be grafted with olefinically unsaturated monomers to give water-dilutable hybrid systems having a particularly high mass fraction of solids. These polyester resins and the hybrid systems obtained from them display considerable improvements in the properties set out above.

The invention accordingly provides water-dilutable polyester resins ABCD having a mass fraction of from 1 to 10% of units derived from unsaturated cocondensed building blocks, preferably unsaturated carboxylic acids, especially unsaturated fatty acids, an olefinic double bond content of from 10 to 2000 mmol/kg, preferably from 20 to 1500 mmol/kg, and more preferably from 30 to 1200 mmol/kg, and a sulfonic acid group content of from 20 to 300 mmol/kg, preferably from 30 to 200 mmol/kg, more preferably from 40 to 170 mmol/kg.

The invention further provides water-dilutable modified polyester resins ABCDE having a mass fraction of from 1 to 10% of units deriving from unsaturated cocondensed building blocks, a mass fraction of vinyl polymer, produced by polymerizing olefinically unsaturated monomers E in the presence of a polyester ABCD, of from 20 to 80%, preferably from 25 to 60%, and more preferably from 30 to 50%, and a sulfonic acid group content of from 4 to 240 mmol/kg.

DETAILED DESCRIPTION OF THE PREFERRED EMBODIMENTS

The polyester resins ABCD are obtainable by polycondensation of hydroxy-functional compounds A containing on average at least two hydroxyl groups per molecule, acids B, containing on average at least two acid groups per molecule, a mass fraction of from 0.5 to 20%, preferably from 1 to 15%, and in particular from 1.5 to 10% of a compound D which, in addition to at least one functional group which is to be incorporated into a polyester under condensation conditions and is selected from hydroxyl groups, carboxyl groups, and amino groups, includes at least one sulfonic acid group in the molecule, and unsaturated compounds C containing at least one group, preferably two groups, which are reactive under condensation conditions with hydroxy-functional or acid-functional compounds and are selected from hydroxyl groups, amino groups, carboxylic acid groups, sulfonic acid groups, and phosphonic acid groups, especially monocarboxylic, dicarboxylic or polycarboxylic acids C1 having 10 to 30 carbon atoms in the case of unsaturated monocarboxylic acids or 4 or 7 to 30 carbon atoms in the case of unsaturated dicarboxylic acids and polycarboxylic acids, respectively.

The hydroxy-functional compounds A are preferably ethylene glycol, 1,2-and 1,3-propylene glycol, 1,4-butanediol, neopentyl glycol, 1,6-hexanediol, 1,2-and 1,4-dihydroxycyclohexane, 3,4-diethyl-3,4-hexanediol, and 1,4-bis (hydroxymethyl)cyclohexane, each used individually or in a mixture. Particular preference is given to glycol, neopentyl glycol, and 1,2-propylene glycol. In mass fractions of up to 10% it is also possible to use polyhydric alcohols such as glycerol, erythritol, pentaerythritol, trimethylolpropane, and sorbitol. It is also possible for some of the hydroxy-functional compounds to be replaced by epoxide compounds which react with the acids under ring opening to form hydroxy esters.

The acids B are preferably dibasic carboxylic acids such as adipic acid, succinic acid, sebacic acid, cyclohexanedicarboxylic acid, phthalic acid, isophthalic acid, and terephthalic acid, sulfonyldibenzoic acid, oxydibenzoic acid, and the isomeric naphthalenedicarboxylic acids, and also dimeric fatty acids, which are obtained by catalyzed dimerization of unsaturated fatty acids (e.g., tall oil fatty acid) as a mixture of acyclic and cyclic dicarboxylic acids. It is also possible to use acids with an acid functionality of three more in a mass fraction of up to 10%. Preferred examples include trimellitic acid, trimesic acid, cyclohexanetricarboxylic acid, benzophenonetetracarboxylic acid, and pyromellitic acid. Particular preference is given to adipic acid and the isomeric phthalic acids, each individually or in a mixture. Suitable compounds D containing sulfonic acid groups are preferably acids such as sulfoisophthalic acid in particular, and also sulfonylsuccinic acid, 4-amino-3-hydroxynaphthalenesulfonic acid, N,N-bis(hydroxyethyl)-2-aminoethanesulfonic acid, naphthol-3,6-disulfonic acid, 4-amino-5-hydroxynaphthalenesulfonic acid, and 6,7-dihydroxynaphthalene-2-sulfonic acid.

The unsaturated compounds C are preferably fatty acids C1 such as oleic acid, linoleic acid, linolenic acid, ricinoleic acid, elaidic acid, arachidonic acid, erucic acid, and eleostearic acid or mixtures thereof, other unsaturated acids such as maleic acid, fumaric acid, acrylic acid, methacrylic acid, and tetrahydrophthalic acid, or hydroxy-functional compounds such as allyl alcohol.

Monofunctional hydroxy compounds A' and/or monofunctional acids B' may also be present during the polycondensation as well in amount-of-substance fractions such that the ratio of the amount of substance of monofunctional compounds to that of compounds having a functionality of two or more is not more than 0.03 mol/mol.

Instead of the hydroxy compounds A and the acid compounds B it is also possible to use hydroxy acids, such as hydroxybenzoic acid, 2-hydroxy-6-naphthoic acid, and the like, and also aliphatic hydroxy acids or lactones derived therefrom, such as lactic acid, gamma-hydroxybutyric acid, delta-hydroxyvaleric acid, and epsilon-hydroxycaproic acid.

The monomers E, which are preferably polymerized in a mixture of at least two different monomers in the presence of the polyester resins ABCD in aqueous emulsion, are selected from unsaturated esters E1, hydroxyl-containing unsaturated esters E2, unsaturated acids E3, and olefinic unsaturated monomers E4 containing none of the aforementioned functional groups and being selected from the group consisting of olefinically unsaturated aromatics such as styrene, vinyltoluene, and alpha-methylstyrene; vinyl halides such as vinyl chloride and vinylidene chloride; unsaturated nitriles such as acrylonitrile and methacrylonitrile; vinyl ethers such as methyl vinyl ether; unsaturated amides such as acrylamide and methacrylamide; and unsaturated ketones such as methyl vinyl ketone and diacetone (meth)acrylamide.

Where unsaturated ketone monomers E4 are among those used it is also possible to formulate self-crosslinking binders from the resins ABCDE by admixing an aqueous dispersion comprising them with diamines or, preferably, dihydrazines or dihydrazides, which react as crosslinkers by forming Schiff bases or hydrazones. Particular preference is given to dihydrazides of aliphatic dicarboxylic acids, such as adipic dihydrazide, for example.

Where the monomers E4 used at least include diolefins, such as divinylbenzene, for example, then crosslinks between at least two of the polyester molecules are formed even during the polymerization step. Depending on the amount of diolefins employed, the polymerization produces crosslinked microgels or systems with only a low degree of crosslinking.

The polyester resins of the invention can be employed in particular for formulating coating materials for coating plastics and other temperature-sensitive substrates such as paper, cardboard, and textiles. They are also suitable for formulating traffic marking paints. In addition to the advantageous properties already mentioned above, namely those of rapid (physical) drying particularly in the case of highly pigmented coating materials (masonry paints, road marking paints), high crosslinking rate and/or reduced crosslinking temperature with amino resins (melamine resins), the absence of pop marks in relatively thick films (clearcoats) up to about 100 μm, the absence of wrinkles in the dried coating film, and the improved resistance to solvents and aqueous solutions, a further quality is the insensitivity to discoloration on contact with dye pastes (shoe polish, for example, in the "yellow dye test", especially in floor coatings).

The examples which follow illustrate the invention without restricting its scope. The formerly so-called "intrinsic viscosity number", termed "Staudinger Index" $J_g$ according to DIN 1342, part 2.4, is the limiting value of the Staudinger function $J_v$ at decreasing concentration and shear stress, with $J_v$ being the relative change in viscosity based on the mass concentration $\beta_B = m_B/V$ of the dissolved substance B (with the mass $m_B$ of the substance in the volume V of the solution), i.e., $J_v = (\eta_r - 1)/\beta_B$. In this formula $\eta_r - 1$ denotes the relative change in viscosity, in accordance with $\eta_r - 1 = (\eta - \eta_s)\eta_s$. The relative viscosity $\eta_r$ is the ratio of the viscosity $\eta$ of the solution under analysis to the viscosity $\eta_s$ of the pure solvent. (The physical meaning of the Staudinger Index is that of a specific hydrodynamic volume of the solvated polymer coil on infinite dilution and in the state of rest.) The unit normally used for J is "$cm^3/g$"; earlier often "dl/g".

EXAMPLES

Polyester Resins

Example 1

208 g of neopentyl glycol, 186 g of ethylene glycol, 22 g of sulfoisophthalic acid, 1 g of dibutyltin oxide, 0.7 g of triphenyl phosphite and 222 g of phthalic anhydride were charged to a reactor and heated to 180° C. The temperature was left constant with stirring until a clear melt had formed. Thereafter 222 g of phthalic anhydride and 49 g of maleic anhydride were added and the mixture was heated to 205° C. over the course of 2 hours. The water of reaction was distilled off azeotropically by addition of 35 g of xylene, and the xylene separated from the water was recycled. Reaction continued at this temperature, with water separation, until the acid number of the reaction mixture had dropped to less than 5 mg/g (about 5 hours). Following the addition of 75 g of isophthalic acid esterification was continued, with removal of the water of reaction, until the Staudinger Index was about 14 $cm^3/g$ (measured in chloroform solvent at 23° C.). Then 45 g of isononanoic acid were added and esterification was continued to a Staudinger Index of about 20 $cm^3/g$. Xylene was subsequently removed by distillation under reduced pressure. The reaction mixture was held further at 200° C. until a Staudinger Index of about 24 $cm^3/g$ was reached. Thereafter the reactor was cooled and the contents were diluted with a mixture of 20 g of methoxypropoxypropanol, 100 g of methoxypropanol and 100 g of butyl glycol. The solution obtained was emulsified in 700 g of distilled water.

Analysis of the dispersion gave the following results:

| | |
|---|---|
| Mass fraction of solids*: | 50%, |
| pH: | 3.1 |
| Dynamic viscosity+: | 3 046 mPa · s |
| Acid number: | 15.7 mg/g |

*measured as nonvolatile fraction on drying at 120° C. for five minutes
+measured on a 50% strength solution in chloroform at 10 s$^{-1}$ and 23° C.

Example 2

208 g of neopentyl glycol, 186 g of ethylene glycol, 22 g of sulfoisophthalic acid, 1 g of dibutyltin oxide, 0.7 g of triphenyl phosphite and 222 g of phthalic anhydride were charged to a reactor and heated to 180° C. The temperature was left constant with stirring until a clear melt had formed. Thereafter 222 g of phthalic anhydride and 49 g of maleic anhydride were added and the mixture was heated to 205° C. over the course of 2 hours. The water of reaction was distilled off azeotropically by addition of 35 g of xylene, and the xylene separated from the water was recycled. Reaction continued at this temperature, with water separation, until the acid number of the reaction mixture had dropped to less than 5 mg/g (about 5 hours). Following the addition of 75 g of isophthalic acid esterification was continued, with removal of the water of reaction, until the Staudinger Index was about 20 cm$^3$/g (measured in chloroform solvent at 23° C.). Xylene was subsequently removed by distillation under reduced pressure. The reaction mixture was held further at 200° C. until a Staudinger Index of about 24 cm$^3$/g was reached (about 10 hours). Subsequently the temperature was lowered to 180° C. and 45 g of ®Cardura E10 (glycidyl ester of ®Versatic-10 acid, Deutsche Shell Chemie GmbH) were added. The temperature was held for 90 more minutes and then the reactor was cooled and the contents were diluted with a mixture of 20 g of methoxypropoxypropanol, 100 g of methoxypropanol and 100 g of butyl glycol. The solution obtained was emulsified in 700 g of distilled water.

Analysis of the dispersion gave the following results:

| | |
|---|---|
| Mass fraction of solids: | 50%, |
| pH: | 3.3 |
| Dynamic viscosity: | 1 417 mPa · s |
| Acid number: | 5.5 mg/g |

(Measurement conditions as above)

Example 3

150 g of the monoester of Juvandol fatty acid with trimethylolpropane, 300 g of neopentyl glycol, 160 g of ethylene glycol, 22 g of sulfoisophthalic acid, 1 g of dibutyltin oxide, 0.7 g of triphenyl phosphite, 250 g of isophthalic acid and 230 g of terephthalic acid were charged to a reactor and heated to 180° C. The temperature was then raised to 230° C. over 5 hours with stirring and left at this temperature for 2 hours. Under reduced pressure (about 20 hPa) the excess quantities of glycols and waterwere removed by distillation. Thereafter 70 g of isophthalic acid were added and after the addition of 42 g of xylene esterification was continued with azeotropic removal of the water of reaction at about 225° C. until the Staudinger Index was about 14.5 cm$^3$/g (measured in chloroform solvent at 23° C.). Xylene was then removed by distillation under reduced pressure. The reaction mixture was held further at 225° C. until a Staudinger Index of about 17 cm$^3$/g was reached (about 8 hours). Thereafter the reactor was cooled and the contents were diluted with a mixture of 20 g of methoxypropoxypropanol, 108 g of methoxypropanol and 108 g of butyl glycol. The solution obtained was emulsified in 870 g of distilled water.

Analysis of the dispersion gave the following results:

| | |
|---|---|
| Mass fraction of solids: | 46%, |
| pH: | 3.1 |
| Dynamic viscosity: | 1 320 mPa · s |
| Acid number: | 6.7 mg/g |

(Measurement conditions as above)

Example 4

75 g of the monoester of Juvandol fatty acid with trimethylolpropane, 310 g of neopentyl glycol, 165 g of ethylene glycol, 20 g of sulfoisophthalic acid, 1 g of dibutyltin oxide, 0.7 g of triphenyl phosphite, 270 g of isophthalic acid and 230 g of terephthalic acid were charged to a reactor and heated to 180° C.

The temperature was then raised to 230° C. over 5 hours with stirring and left at this temperature for 2 hours. Under reduced pressure (about 20 hPa) the excess quantities of glycols and waterwere removed by distillation. Thereafter 70 g of isophthalic acid were added and after the addition of 42 g of xylene esterification was continued with azeotropic removal of the water of reaction at about 225° C. until the Staudinger Index was about 14.5 cm$^3$/g (measured in chloroform solvent at 23° C.). Xylene was then removed by distillation under reduced pressure. The reaction mixture was held further at 225° C. until a Staudinger Index of about 17 cm$^3$/g was reached (about 8 hours). Thereafter the reactor was cooled and the contents were diluted with a mixture of 20 g of methoxypropoxypropanol, 103 g of methoxypropanol and 103 g of butyl glycol. The solution obtained was emulsified in 930 g of distilled water.

Analysis of the dispersion gave the following results:

| | |
|---|---|
| Mass fraction of solids: | 44%, |
| pH: | 3.1 |
| Dynamic viscosity: | 1 380 mPa · s |
| Acid number: | 8.2 mg/g |
| Weight-average molar mass $M_w$#: | 10 300 g/mol |

Gel permeation chromatography(polystyrene calibration), otherwise measurement conditions as above Hybrids of Polyester Resins and Addition Polymers Example 5

226 g of the dispersion of the polyester from example 4 were diluted with 42 g of distilled water and heated to 75° C. Metered into this dispersion with thorough stirring over the course of 4 hours at a uniform rate were a mixture of 80 g of styrene, 10 g of hydroxyethyl methacrylate, 10 g of butyl acrylate and 0.06 g of tert.-butyl hydroperoxide and, separately therefrom, a mixture of 1.5 g of a solution of ascorbic acid in water (10 g of ascorbic acid in 100 g of solution) and 30 g of distilled water. After the end of the addition the polymerization reaction was continued for 2 more hours and then a further 0.3 g of tert.-butyl hydroperoxide and, separately therefrom, 0.8 g of the said solution of ascorbic acid in water were added. Polymerization was continued until the calculated mass fraction of solids had been reached (approximately two hours). Thereafter the dispersion was cooled and filtered through plate filters with a cutoff of 5 μm.

Analysis of the dispersion gave the following results:

| Mass fraction of solids: | 50% |
| --- | --- |
| pH: | 3.2 |
| Dynamic viscosity: | 1 170 mPa · s |
| Weight-average molar mass $M_w$: | 158 900 g/mol |

Measurement conditions as above

Example 6

178 g of the dispersion of the polyester of example 3 were diluted with 20 g of distilled water and heated to 75° C. Metered into this dispersion with thorough stirring over the course of 4 hours at a uniform rate were a mixture of 50 g of styrene, 30 g of methyl methacrylate, 10 g of hydroxyethyl methacrylate, 10 g of butyl acrylate and 1.0 g of tert.-butyl hydroperoxide and, separately therefrom, a mixture of 2.5 g of a solution of ascorbic acid in water (10 g of ascorbic acid in 100 g of the solution) with 30 g of distilled water. After the end of the addition the polymerization reaction was continued for 2 more hours and then a further 0.3 g of tert.-butyl hydroperoxide and, separately therefrom, 1.25 g of the said solution of ascorbic acid in water were added. Polymerization was continued until the desired mass fraction of solids had been reached. Thereafter the dispersion was cooled and filtered through plate filters with a cutoff of 5 μm.

Analysis of the dispersion gave the following results:

| Mass fraction of solids: | 55% |
| --- | --- |
| pH: | 3.4 |
| Dynamic viscosity: | 920 mPa · s |
| Weight-average molar mass $M_w$: | 147 000 g/mol |

Measurement conditions as above

Example 7

400 g of the dispersion of the polyester of example 1 were diluted with 85 g of distilled water, a mixture of 85 g of styrene and 15 g of 2-ethylhexyl acrylate was emulsified therein. Heating to 75° C. was followed by the addition with thorough stirring and at a uniform rate over the course of one hour of 0.8 g of tert.-butyl hydroperoxide, 1.2 g of a solution of ascorbic acid in water (10 g of ascorbic acid in 100 g of the solution) and 4 g of distilled water. Over the course of a further hour 0.6 g of tert.-butyl hydroperoxide, 0.9 g of the solution of ascorbic acid in water and 4 g of distilled water were added, and again, after a further hour, 0.4 g of tert.-butyl hydroperoxide, 0.9 g of the ascorbic acid solution and 4 g of distilled water. The mixture was held at this temperature with stirring for one hour more and then a further 0.4 g of tert.-butyl hydroperoxide and 1.6 g of the ascorbic acid solution were added. Polymerization was continued until the desired mass fraction of solids was reached. Thereafter the dispersion was cooled and filtered through plate filters with a cutoff of 5 μm.

Analysis of the dispersion gave the following results:

| Mass fraction of solids: | 50% |
| --- | --- |
| pH: | 3.4 |
| Dynamic viscosity: | 220 mPa · s |

Example 8

400 g of the dispersion of the polyester from example 2 were diluted with 85 g of distilled water in which a mixture of 70 g of styrene and 30 g of 2-ethylhexyl acrylate was emulsified. Heating to 75° C. was followed by addition with thorough stirring and at a uniform rate over the course of one hour of 0.8 g of tert-butyl hydroperoxide, 1.2 g of a solution of ascorbic acid in water (10 g of ascorbic acid in 100 g of the solution) and 2 g of distilled water. Over the course of a further hour 0.6 g of tert.-butyl hydroperoxide, 0.9 g of the solution of ascorbic acid in water and 2 g of distilled water were added, and again, after a further hour, 0.4 g of tert.-butyl hydroperoxide, 0.6 g of the ascorbic acid solution and 2 g of distilled water. The mixture was held at this temperature with stirring for one hour more and then a further 0.4 g of tert.-butyl hydroperoxide and 1.6 g of the ascorbic acid solution were added. Polymerization was continued until the desired mass fraction of solids was reached. Thereafter the dispersion was cooled and filtered through plate filters with a cutoff of 5 μm.

Analysis of the dispersion gave the following results:

| Mass fraction of solids: | 50% |
| --- | --- |
| pH: | 3.2 |
| Dynamic viscosity: | 195 mPa · s |

What is claimed is:

1. A water-dilutable polyester resin ABCD derived from hydroxy-functional compounds A containing on average at least two hydroxyl groups per molecule, from acids B containing on average at least two acid groups per molecule, from unsaturated compounds C containing at least one group which is reactive under condensation conditions with hydroxy-functional or acid functional compounds, the said group being selected from the group consisting of hydroxyl groups, amino groups, carboxylic acid groups, sulfonic acid groups, and phosphonic acid groups, and from compounds D having at least one sulfonic acid group per molecule, and additionally at least one group selected from the group consisting of hydroxyl groups, carboxyl groups, and amino groups, having a mass fraction of from 1 to 10% of units derived from unsaturated cocondensed building blocks, an olefinic double bond content of from 10 to 2 000 mmol/kg, and a sulfonic acid group content of from 30 mmol/kg to 200 mmol/kg.

2. A water-dilutable polyester resin ABCDE additionally comprising moieties derived from olefinically unsaturated monomers E obtained by polymerizing olefinically unsaturated monomers E in the presence of the polyester ABCD of claim 1, having a mass fraction of vinyl polymer produced by polymierising the said olefinically unsaturated monomers E of from 20 to 80% in the said water-dilutable polyester resin ABCDE, and a sulfonic acid group content of from 4 mmol/kg to 240 mmol/kg in the said water-dilutable polyester resin ABCDE, the said generated vinyl polymer being obtained by polymerising the said olefinically unsaturated monomers in the presence of the said polyester resin ABCD.

3. The water-dilutable polyester resin as claimed in claim 1, comprising units derived from hydroxy-functional compounds A having on average at least two hydroxyl groups per molecule and from 2 to 20 carbon atoms.

4. The water-dilutable polyester resin as claimed in claim 1, comprising units derived from acids B having on average at least two acid groups per molecule and from 2 to 40 carbon atoms.

5. The water-dilutable polyester resin as claimed in claim 1, comprising a mass fraction of from 0.5 to 20% of units derived from a compound D which in addition to at least one functional group which are incorporated into a polyester under condensation conditions and are selected from hydroxyl groups, carboxyl groups, and amino groups, contains at least one sulfonic acid group in the molecule.

6. The water-dilutable polyester resin as claimed in claim 1, comprising units derived from olefinically unsaturated compounds C containing at least one group which is reactive under condensation conditions with hydroxy-functional or acid-functional compounds and is selected from hydroxyl groups, amino groups, carboxylic acid groups, sulfonic acid groups, and phosphonic acid groups and at least one polymerizable olefinic double bond.

7. The water-dilutable modified polyester resin ABCDE as claimed in claim 2, comprising units of olefinically unsaturated monomers E.

8. A process for preparing a water-dilutable modified polyester resin ABCDE as claimed in claim 2, which comprises polymerizing olefinically unsaturated monomers E in the presence of a polyester resin ABCD in aqueous emulsion having a mass fraction of from 1 to 10% of units derived from unsaturated cocondensed building blocks, an olefinic double bond content of from 10 to 2 000 mmol/kg, and a sulfonic acid group content of from 30 mmol/kg to 200 mmol/kg.

9. A coating composition comprising a polyester resin as claimed in claim 1.

10. A one-pack coating composition comprising a polyester resin as claimed in claim 1 and an amino resin.

\* \* \* \* \*